United States Patent [19]
Rosler et al.

[11] 3,922,221
[45] Nov. 25, 1975

[54] PROCESS FOR CONDITIONING SEWAGE SLUDGES

[75] Inventors: Norbert Rösler; Willi Georg Rudat, both of Essen-Uberruhr; Erhard Albrecht, Essen, all of Germany

[73] Assignee: Rheinstahl Aktiengesellschaft, Germany

[22] Filed: Jan. 18, 1974

[21] Appl. No.: 434,605

Related U.S. Application Data

[63] Continuation of Ser. No. 214,741, Jan. 3, 1972, abandoned.

[30] Foreign Application Priority Data

Jan. 28, 1971  Germany............................ 2103970

[52] U.S. Cl. ........................ 210/50; 210/56; 210/71
[51] Int. Cl.² ........................................... C02C 3/00
[58] Field of Search ............ 210/10, 18, 67, 68, 71, 210/152, 56, 50, 51, 52, 53; 110/8

[56] References Cited
UNITED STATES PATENTS

| | | | |
|---|---|---|---|
| 1,917,516 | 7/1933 | Gilliland | 210/68 X |
| 1,949,181 | 2/1934 | Riley | 210/68 |
| 2,177,857 | 10/1939 | Bevan | 210/18 X |
| 2,242,653 | 5/1941 | Maxwell | 110/7 |
| 2,292,571 | 8/1942 | Komline | 110/7 |
| 2,360,811 | 10/1944 | Kelly et al. | 210/2 |
| 3,229,749 | 1/1966 | Holmer | 159/4 |
| 3,279,603 | 10/1966 | Busse | 210/67 |
| 3,329,107 | 7/1967 | Hatchel et al. | 110/15 |
| 3,397,139 | 8/1968 | Sak | 210/10 X |
| 3,649,534 | 3/1972 | Schotte | 210/10 X |

FOREIGN PATENTS OR APPLICATIONS

259,469  1/1968  Austria

*Primary Examiner*—Thomas G. Wyse
*Attorney, Agent, or Firm*—McGlew and Tuttle

[57] ABSTRACT

Sewage sludge is conditioned and subsequently dehydrated by directing sludge in the form of a spray into a sludge reactor tower after it has first been treated by floating surface aerators in a sludge storage tank. The sludge is first treated to control its pH factor so that it is below 4 and preferably between 2 and 3, and it is sprayed into droplets in the reaction tower at temperatures ranging from 40° to 100°C. Gases from a turbulent bed furnace into which a dehydrated sludge is fed are directed into the reaction tower at a level below a sludge bath in the bottom of the tower and it flows upwardly through the spray droplets to an outlet and to ash removing devices. The sludge which is collected in the bottom of the tower is drained off to a dehydration device, for example a mechanical dehydrator, such as a wire press or centrifuge. The sludge which is removed from the reaction tower is treated with an alkaline material to maintain its pH from between 6.5 to 7. The apparatus includes a sludge reactor tower having a lower end defining a sludge bath and with means for spraying a selected quantity of sludge into the tower. A hot exhaust gas outlet is located above the spray means and means for admitting flue gases into the tower are arranged above the sludge bath at the bottom of the reaction tower and below the spray means.

11 Claims, 1 Drawing Figure

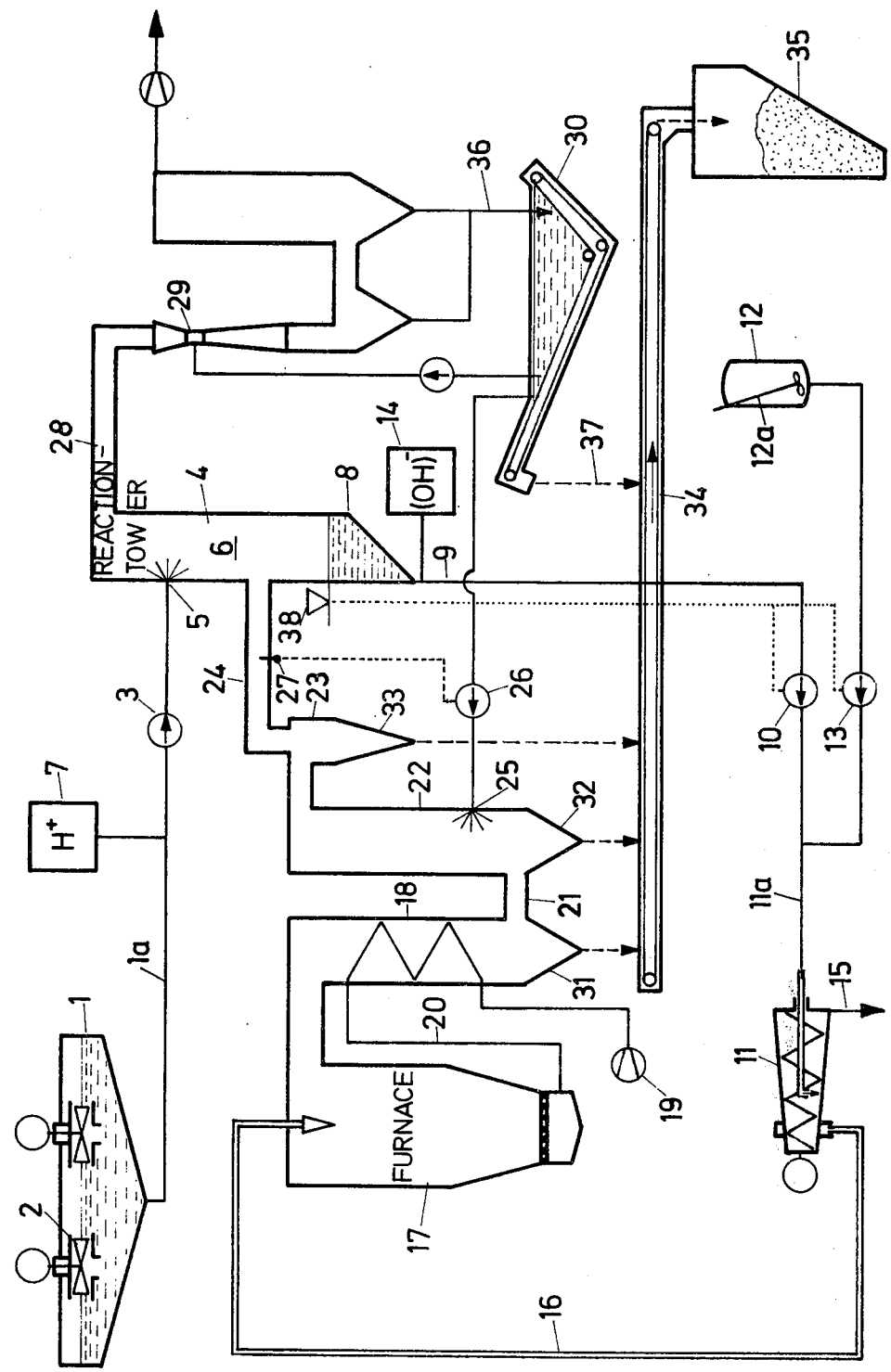

PROCESS FOR CONDITIONING SEWAGE SLUDGES

This is a streamline continuation, filed Jan. 3, 1972, now abandoned.

BACKGROUND OF THE INVENTION

FIELD OF THE INVENTION

This invention relates in general to sludge treatment devices and, in particular, to a new and useful method and apparatus for spraying sludge into a reaction tower through which hot flue gases are circulated and for collecting the sludge in a bath at the lower end from which it is removed and dehydrated.

The invention relates particularly to process and an apparatus for the condtioning and subsequent dehydration of sewage sludges from clarification plants, where the sludges are mixed with flocculants and subsequently dehydrated mechanically.

For the handling of communal sewage, the elimination of the sewage sludges occurring in clarification plants is of ever increasing importance. Numerous attempts have therefore been made to satisfactorily solve the elimination of sewage sludges from communal clarification plants, and accordingly, many pertinent methods are known.

The frequently employed procedure of treating sewage sludges in septic towers and then dehydrating them on dry beds or stocking them in mud ponds or lagoons and letting them dry is usually not feasible in congested industrial areas because of the considerable space requirement. It is therefore necessary to use increasingly mechanical dehydration methods for the dehydration of claification sludge.

Communal sewage sludges contain, besides inorganic solids and depending on their origin from the treatment stages of a clarification plant, body-specific, adsorptively attached and colloidally or truly dissolved organic substances which, particularly for biological plants or clarification works with sludge digestion, consists of proteins. It should be noted that when the intensity of the purification of the surface of the occurring sludge mass, and also its water binding capacity, increases the possibility of mechanical dehydration is reduced.

It is known practice to add flocculants to the sewage sludges, in particular, inorganic electrolyte, organic polyelectrolytes or other surface active substances, which bring about flocculation of the substances and thus increase the mechanical dehydratability. Preferred flocculants are lime and multivalent metal salts, which are added singly or jointly to the sludge before dehydration. A major disadvantage resides in the considerable requirement of chemicals, compared with the amount of dry sludge present, which adversely affects the economic efficiency in a lasting manner.

In known processes for the thermal conditioning of sewage sludges, the sludge is oxidized, for example, in an air atmosphere at pressures from 84 to 126 atm, and temperatures of about 260°C or is heated for up to two hours with exclusion of air to above 175°. By these thermal processes, the substances which inhibit dehydration oxidize in part or go into true solution. Their predominant disadvantage is seen, apart from the cost of instrumentation and the considerable energy requirement, in the high organic contamination of the occurring filtrates.

Lastly, it is also known that known chemical and thermal processes can be applied in combination with one another, in that the sewage sludge is dehydrated after a flocculant addition and the water is removed from the filter cake by evaporation. Apart from the fact that here also the quantity of flocculant added is considerable, the energy consumption for the evaporation of the water makes these combined processes unprofitable.

In another known process for claification sludge removal, highly concentrated sludge is burned in a level furnace. The thickening is done in that the sludge is centrifuged, and the centrifugate, still containing solids is mixed with sludge ash from the combustion and is dehydrated on a filter. The filter and centrifugate residues are conveyed to the furnace for combustion, into the exhaust gas flue of which a partial quantity of centrifugate is sprayed for flue gas purification. While the addition of ash as a known filter aid promotes the mechanical sludge dehydration, the proportionally high addition of about three to five times the dry sludge results in a high dead throughput of the sludge combustion furnace which is economically unfavorable.

A process for sludge treatment by addition of lime and mechanical dehydration has become known, in which after lime is added, and before the dehydration, a partial neutralization with carbon dioxide-containing gases is carried out. In consideration of the lime addition, the partial neutralization with the carbon dioxide-containing gases must be carried out so that the pH value never drops below 10; hence, the reaction takes place in a highly alkaline medium. It is possible to carry out in a single treatment unit, the lime reaction, the partial neutralization of the sludges, and a temperature rise of the sludge to about 50° to 90°C, for example, by passing through the sludge, a flue gas, whose ash components contain lime. The quantity of lime introduced with the flue gas ash is consistently so small that it can reduce the addition of lime only slightly. The lime treatment and the neutralization with exhaust gas has a time requirement of at least half an hour and preferably of about one hour, if a good filter output is to be achieved in dehydrating. As the throughputs of an associated combustion unit and of a dehydration group must be adapted to the lime treatment, large treatment chambers are necessary, which moreover require special protective measures because of the high alkalinity of the medium. The above described process therefore does not satisfactorily solve the problem of the elimination of sludge clarification either.

Another process for the dehydration of clarification and industrial sludges, in particular of fresh and putrid sludges, includes the addition of multivalent metal salts as flocculants and subsequent heating to be known. It is characterized in that the sludge is heated, after or during the addition of the flocculant, in less than 15 minutes to temperatures of 50° to 100°C and is thereafter immediately dehydrated. Preferably, the sludge heating is carried out to 70° to 95°C in 5 – 10 minutes. It is thereby achieved that the colloidally dissolved protein compounds coagulate and thus remain in the residue when being dehydrated. This is true when the dehydration is carried out immediately after the heating, without further intermediate treatments, as for example, an addition of flocculant, and without interposition of pumps. If the heating lasts longer or if the sludge cools again after the heating and before the dehydrating, then the coagulated protein compounds change to slimy structures; hence, the sludge is denatured only reversibly.

The problem underlying the invention is to improve the dehydratability of the sludges after previous addition of flocculants and, in particular, to achieve that with the centrifuging or filtering the dry substance proportion in the residue is increased, that the body specific proteins contained in the sludges are concentrated and brought into an irreversibly coagulated state, and that nevertheless, the time requirement for the sludge conditioning is maintained low.

SUMMARY OF THE INVENTION

In accordance with the present invention, the sludge is atomized into small droplets and directed into the upper end of a reaction tower through which is passed a hot gas atmosphere. The sludge is collected in a bath at the bottom of the tower and is conveyed to a station at which a flocculant is added and it is then passed to the device for carrying out its dehydration. It has been found with the invention that the proteins in the sludge droplets are denatured irreversibly by the hot gas atmosphere practically immediately, that is, within a negligible period of time, and the proteins lose their water-binding capacity by coagulating. At the same time, the proteins bind to themselves other dehydration-inhibiting substances so that with the subsequent flocculant addition, a very high efficiency is obtained.

Since for sludge elimination, a sludge burning system often follows the dehydration, a particularly simple and expedient form of the invention provides that the sludge droplets are passed through a $CO_2$-containing flue gas atmosphere coming from the combustion system. The flue gas atmosphere brings about, or at least supports, another advantageous and essential feature of the invention, i.e., that the sludge droplets are acidified, on being heated, to $p_H$ values below 4, in particular, between $p_H2$ and $p_H3$. Possibly, the mentioned optimum $p_H$ values can be adjusted by addition of acid before the sludge is atomized. It has been found, surprisingly, that the combined action of sudden heating and sufficiently acid basicity of the sludge droplets leads not only to a stably irreversible protein denaturation but also to an additional precipitation of other substances difficult to filter off, which is maintained even when the sludge cools off again after this treatment.

It has further been found, surprisingly, that the dehydratability of the sludge can be increased even more when after the heating of the acid sludge droplets, the basicity of the sludge is, according to a further feature of the invention, raised by basic additions into the neutral range or slightly higher. An optimal adaptation of the basicity to the flocculant used is desirable. The achieved irreversible denaturation of the proteins and their simultaneous precipitation with other dehydration-inhibiting substances also permits the use of those mechanical dehydration devices which attain a high throughput only in conjunction with pumps, such as centrifuges.

By the combination of the above mentioned measures, not only very short dehydration times at high dehydration output, but also high efficiencies of the added flocculants and higher dry substance contents than were normal theretofore are achieved.

Lime is added as a neutralizing agent, by which the fatty acids contained in the sludge are transformed into insoluble lime soaps, which are especially easy to separate on dehydrating.

A further embodiment of the invention provides the addition of calcium chloride to the sludge before the atomization. Thereby, essential advantages are achieved in the sense that the sludge is acidified and, at the same time, calcium ions are introduced which later cause the previously mentioned advantageous formation of lime soaps. Since calcium chloride is available in large quantities at low price, this measure can, as a rule, contribute appreciably to the economic efficiency of the process according to the invention.

The complete and irreversible denaturation of the proteins of the sludge can be achieved with most sewage compositions by heating the sludge droplets suddenly to a temperature of 41° to 100°C, preferably in the range of 60° to 85°C, the average permanence of the sludge droplets in the gas atmosphere being expediently taken in the order of 1 – 10 sec. This can readily be achieved by the adjustment of a favorable droplet size and, when using hot flue gases from a combustion furnace, by the further measure that the flue gas is cooled before its action on the sludge droplets, notably by injection of water.

According to another essential feature of the invention, when cooling with water, the water vapor partial pressure can be adjusted to an optimum value so that in the reactor, the temperature falls below the dew point and the sludge droplets suffer a thermal shock from the liberated heat of condensation, which initiates the irreversible denaturation of the proteins especially effectively.

As has been set forth already, the proteins of the sludges, irreversibly denatured according to the invention, bring about an increased efficiency of the added flocculants. Therefore, the invention further proposes to concentrate the proteins contained in the sludges by adding oxygen to them at a time when they are being held ready, for instance in a storage basin and before the atomizing, so that the organic substances, adsorptively attached to the sludge flakes and dissolved truly or colloidally, can be transformed by the organims into body-specific proteins. The supply of oxygen can be effected with means known in themselves, for example, by introducing air into the storage basin.

An apparatus suitable for the practice of the process, according to the invention, consists preferably of a tower-type sludge reactor having an injection device whose passage cross-section for the sludge is adjustable. The tower reactor has an outlet connection for hot exhaust gas and a gas inlet pipe which is above the sludge bath. The tower base section forms a tank for the sludge bath with an outflow pipe leading to the dehydration stage. To avoid clogging, the injection device has large passage cross-sections. Therefore, there are suitable for this purpose in particular known eccentric nozzles with adjustable nozzle cross-section or known rotation atomizers. They permit, together with control of the operating pressure, optimum adjustment of the size of the sludge droplets and hence, of their average permanence in the reactor and of their temperature rise.

In the process according to the invention, the sludge droplets are preferably passed through a $CO_2$-containing flue gas atmosphere originating from a sludge-burning furnace. A turbulent bed furnace is provided for burning the sludge after it is drawn from the sludge reactor and dehydrated. A preheater is arranged at the furnace for heating the combustion air of the furnace. The furnace bottom is designed as an ash funnel (or hopper) with a discharge opening. Apart from the known advantages of a turbulent bed furnace of the kind referred to, in which for example, spontaneous combustion takes place even at very low calorific value of its charge, the most significant advantage with respect to the invention consists in that its flue gases contain a large proportion of carbon dioxide. Thereby, the sludge droplets are acidified in the reactor besides being heated. This means that for the proper acidification to certain $p_H$ values, it is not necessary to add as much acid.

The invention further recommends introducing the hot flue gases into a pre-cooler before they enter the sludge reactor, and cooling them by injection of a coolant, preferably, water or ash sludge. Preferably, the hot gas is cooled down from 200°C to 500°C. By adjusting the quantity of coolant, not only the temperature, but also the degree of saturation (water vapor partial pressure) of the flue gases at the entrance to the sludge reactor, can be varied. Both factors influence the intensity of the heat and material exchange in the sludge reactor and, hence, the temperature and the $CO_2$ absorption of the sludge to be treated. Together with the already mentioned possibility of regulation in the sludge reaction, optimum conditions for the sludge conditioning can thus be adjusted.

According to a feature of the invention already mentioned, the water vapor-containing flue gases may be cooled off, after release of heat to the sludge in a lower area of the reactor so that their temperature falls to the dew point or below, so that they are water vapor-saturated or super-saturated. A small portion of the water vapor from the flue gases then condenses and transfers the liberated heat of condensation to the sludge droplets particularly effectively and for a short time. The heat exchange, and at the same time the $CO_2$ transfer, are thereby especially intensified.

An essential advantage of the invention is seen in that the flue gas velocity in the sludge reactor and the size of the sludge droplets can be adapted to each other with the mentioned means in a sufficiently wide range in such manner that only a small portion of the fine fly ash carried with the flue gases precipitates and thus passes into the sludge. Thereby, the efficency of the mechanical dehydration stage is not adversely influenced and the dead load of the furnace by ash is maintained negligibly small. The coarser fly ash is therefore advantageously discharged dry before the reactor, e.g., in a cyclone separator. The separator is inserted between the pre-cooler and the sludge reactor, so that it operates in a temperature range favorable for its efficiency and the material selection.

The residual dust removal and an optional deodorization of the flue gases takes place in a wet scrubber, in that the outlet connection of the sludge reactor is connected with a wet dust precipitator, e.g., a Venturi dust precipitator, for the flue gases. Referred to the total ash quantity occurring, the residual ash still to be eliminated from the flue gases in the wet dust precipitator is a small quantity, so that relatively little ash sludge is produced. This ash sludge can always be taken up completely by mixing with the dry ash, resulting in an ash having a moisture content between about 20 and 40%, the consistency of which is particularly favorable for further handling.

As has been mentioned, instead of water, ash sludge can be injected into the pre-cooler according to the invention. Thereby, the ash sludge quantity to be removed can be further reduced and the additional advantage can be achieved that in the pre-cooler, the droplets are atomized more finely by the sludge solid particles contained in them and hurled out when being injected, so that the necessary evaporation and mixing path can be made shorter.

Accordingly, it is an object of the invention to provide a process for conditioning and subsequently dehydrating sewage sludges which are received from clarification plants which comprises atomizing the sludge into a reaction tower having a hot gas atmosphere and collecting the treated sludge in the bottom of the reaction tower and removing it and dehydrating it.

A further object of the invention is to provide a process for first treating a sewage sludge by use of surface deaerators and then passing it through an acid treatment to maintain the $p_H$ factor below 4 and directing it in the form of fine droplets as a spray into a reaction tower through which flue gases are circulated from a furnace burning the sludge and collecting the treated sludge in the bottom of the reaction tower and removing it and dehydrating it and passing it into the furnace which burns the sludge, and between the dehydrator and the reaction tower controlling the $p_H$ to between 6½ to 7 by adding an alkaline material thereto.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a schematic view of a sludge treatment system constructed in accordance with the invention.

GENERAL DESCRIPTION OF THE PREFERRED EMBODIMENT

Referring to the drawing in particular, the invention embodied therein comprises, a system for treating sewage sludge, which includes a sewage storage basin 1, in which the sewage is held in order to thicken it to a somewhat higher dry substance content as compared with its original state. The sludge in the sludge storage basin 1 is intensively aerated by means of known floating surface aerators 2, in order to transform the organic substances adsorptively attached to the sludge particles into body-specific proteins as extensively as possible. One or more eccentric worm pumps 3 are arranged in a discharge line la from the bottom of the storage basin 1, to remove the sludge from the basin and to direct it through injection or spray means 5, which are located adjacent the upper end of a reaction tower 4. The spray means 5 advantageously comprises eccentric nozzles equipped with adjustable means for varying the flow cross-section and the sludge is directed into a flue gas atmosphere, which is maintained within the tower, in the form of droplets of a size selected so that their mean permanence in the flue gas atmosphere designated 6 is in the order of about 1 – 10 sec, so that the droplets become heated suddenly in dependence on the flue gas temperature to about 41° to 100°C and preferably in the range of 60° to 85°C. A tank 7 is connected to the connecting line la and it contains an acid or a calcium hydroxide solution for the purpose of supporting the acidification of the sludge droplets when they contact the $CO_2$-containing flue gas in order to maintain the $p_H$ values below 4, and preferably between 2 and 3 in the furnace.

The bottom portion of the sludge reactor 4 forms a sludge bath or tank 8 having a discharge connection or conduit 9 through which the denatured sludge is supplied by means of a pump 10 to a mechanical dehydration device 11, which is in the form of a wire press or centrifuge. Into a mixing line 11a extending from the pump 10 to the mechanical dehydration device 11, there is added a flocculant which is supplied from a flocculant tank 12 by a pump 13 into the mixing line 11a. A common flocculant, preferably a synthetic polymer, in particular with a base of copolymers or polyacrylamide or metacrylate, is employed. This flocculant is prepared in the tank 12 and mixed by suitable mixing means 12a to the required concentration and optimum degree of curing and is directed into the denatured sludge by the pump 13 at a location shortly before the dehydration device 11. Conduit 9 is connected to an alkaline supply tank 14, which preferably contains a hydrate of lime or caustic lime, which serves for the neutralization of the acidified sludge to an optimum $p_H$ value corresponding to the particular flocculant which is employed and, in the present instance, to about a $p_H$ of from 6.5 to 7.

A fresh mixture sludge from a fully biological clarification plant, which consists of a preclarification sludge and excess activated sludge in the volume ratio of about 1 : 4 and which contains about 7% solids and which has been treated by the process according to the invention, in particular bby acidification to a $p_H$ of 2.5, and which is subjected to atomization with a shock heating and a neutralizing to a $p_H$ of 6.5 requires an addition of only about 40 g/m³ polyacrylamide as a flocculant in order to subsequently be subjected to dehydration to about 31% dry substance on a solid jacket worm centrifuge. In comparison, the same sludge requires for a flocculation with polyacrylamide only about 4 times as much flocculant (without previous conditioning) and yet, it attains with the mentioned centrifuge, a dehydration to about only 23% dry substance content.

The drive motors (not shown) of pumps 10 and 13 are connected to each other and are controlled by a level regulator 38 of the sludge bath tank 8. The level in the tank 8 is maintained at a predetermined amount and when the flow is such that it exceeds this amount, the pumps are switched on.

The purified water is returned to the clarification plant through the conduit 15 which is directed outwardly from the mechanical dehydrator 11. The residue of the mechanical dehydration device in the form of a sludge cake is transported through a suitable conveyor means 16, such as a carrying chain or conveyor chain (not shown), into a turbulent bed furnace 17 and it is burned there in an automatic operation. The flue gas, which is generated in the furnace 17 contains about 12 to 18% carbon dioxide. A preheater is arranged in an outlet flue or preheater chamber 18 to heat combustion air introduced by the blower 19 and direct it through a conduit 20 into the lower end of the furnace 17. The furnace 17 includes known devices for the supply of heating oil and for the starting up of the turbulent bed furnace and for the simultaneous combustion of the trash rock and sand trap material from the clarification plant as well as of used oils and oil emulsions which can be destroyed without additional expense and which are not shown in the drawing.

The flue gas, after it is cooled to about 500° to 800°C, flows through the outlet pipe 21 of the air preheater into the precooler 22, and thence into the dry dust precipitator 23, which is in the form of a cyclone separator, which is connected with the gas admission pipe 24 of the sludge reactor 4 discharging above the sludge bath 8. By means of the spray nozzles 25, water, or preferably ash sludge, is injected into the precooler 22, and the quantity of water is influenced by the pump 26 which has a regulating device controlled by a sensor 27. With the apparatus described, it is possible to adjust the flue gas in the sludge reactor 4 to the necessary operating conditions of temperature and degree of water vapor saturation which are most favorable for the irreversible denaturation of the proteins contained in the sludge droplets and for the subsequent simultaneous precipitation of the droplets with other dehydration-inhibiting substances.

The reaction tower 4 includes a gas outlet 28 which is connected with a wet dust precipitator 29 in the form of a Venturi washer. In this precipitator 29, a fine ash passed through the reactor 4 is separated out from the flue gas by being washed out. The wet dust precipitator is fed with water from the ash settling basin 30 through a conduit 31.

The sludge ash which is discharged from the turbulent bed furnace 17 almost completely, with the flue gas, is drawn off dry from the ash funnels 31, 32 and 33 of the preheater 18, the precooler 22 and the dry dust precipitator 23 and it is conveyed to the ash silo 35 over a vertical conveyor 34. In respect to the total ash content, the ash sludge introduced from the wet dust precipitator 29 into the ash settling basin 30 through the feed line 36 is only a small proportion. Any ash sludge not injected into the precooler 22 is passed through a conduit 37 and over the vertical conveyor 34 to the ash silo 35 and it is used for wetting the dry ash so that it becomes easier to handle.

While a specific embodiment of the invention has been shown and described in detail to illustrate the application of the principles of the invention, it will be understood that the invention may be embodied otherwise without departing from such principles.

What is claimed is:

1. In a process for pretreating sewage sludges prior to flocculation treatment, particularly sewage sludges coming from clarification plants, the improvement which comprises acidifying in a first pretreatment step said sludge to a pH below 4 and then spraying and disintegrating the sludge in a hot gas atmosphere saturated with moist water vapor, and rapidly heating the disintegrated sludge to a temperature in the range of from 41° to 100°C in a reaction time of about 1 to 10 seconds and forming the so-heated sludge into droplets in said hot gas atmosphere; accumulating and collecting the so-heated sludge droplets in a sludge bath, wherein the pH value of the sludge accumulated in said bath is adjusted in a second pretreatment step by addition of basic additives to said sludge (into) to at least a neutral range of about 6.5 – 7.0 pH; and subsequently removing the pretreated sludge from said bath and coagulating the so-pretreated sludge by addition thereto of a flocculant, and subsequently mechanically dehydrating the pretreated and coagulated sludge.

2. The improved process according to claim 1, wherein the dehydrated sludge is burned to form the hot gas current and said hot gas current is moistened by adding water to cool it down approximately from 200°C to 500°C.

3. The improved process, according to claim 2, including burning the dehydrated sludge to form the said gas which is employed for pretreating the sludge.

4. The improved process, according to claim 2, wherein the flocculant comprises a synthetic polymer, said dehydration being carried out by mechanical dehydration.

5. The improved process for conditioning sewage sludges, according to claim 1, wherein the hot gas atmosphere is a $CO_2$ atmosphere.

6. The improved process for conditioning sewage sludge, according to claim 5, wherein the sludge is held in a holding tank before it is sprayed and said process includes adding oxygen to the sludge while it is held.

7. The improved process for conditioning sewage sludge, according to claim 1, wherein the sludge is acidified by addition of acid before it is sprayed.

8. The improved process for conditioning sewage sludge, according to claim 1, including adding calcium chloride to the sludge before it is sprayed.

9. The improved process for conditioning sewage sludge, according to claim 1, wherein the hot gas is adjusted to a given water vapor partial pressure so that the temperature of the gas atmosphere in the sludge reactor falls below the dew point at least in some areas.

10. The improved process for conditioning sewage sludge, according to claim 1, wherein the sludge is neutralized with lime in said second pretreatment step.

11. The improved process for conditioning sewage sludge, according to claim 1, wherein the sludge droplets are heated to a temperature of from about 60°C to about 85°C in said treating step.

* * * * *